(12) United States Patent
Kinoshita

(10) Patent No.: US 6,488,135 B1
(45) Date of Patent: Dec. 3, 2002

(54) ROTATION TRANSMITTING DEVICE INCORPORATING ONE-WAY CLUTCH

(75) Inventor: Takashi Kinoshita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/711,092

(22) Filed: Nov. 14, 2000

(30) Foreign Application Priority Data

May 9, 2000 (JP) ........................ 2000-135715

(51) Int. Cl.$^7$ ................ F16D 41/067; F16H 55/36
(52) U.S. Cl. ................ 192/45; 192/110 B
(58) Field of Search ............... 192/45, 45.1, 110 B; 123/192.1

(56) References Cited

U.S. PATENT DOCUMENTS

| | | | | |
|---|---|---|---|---|
| 3,623,581 A | * | 11/1971 | Livezey | 192/113.32 |
| 3,863,742 A | * | 2/1975 | Elmore et al. | 192/45 |
| 3,902,580 A | * | 9/1975 | Johnson | 192/45 |
| 3,942,616 A | * | 3/1976 | Elmore | 192/45 |
| 4,821,857 A | * | 4/1989 | Groh | 192/45 |
| 5,908,094 A | * | 6/1999 | Le-Calve | 192/109 R |
| 6,170,625 B1 | * | 1/2001 | Tanaka | 192/110 B |
| 6,237,736 B1 | * | 5/2001 | Ouchi | 192/41 R |
| 6,257,385 B1 | * | 7/2001 | Ouchi | 192/110 B |

FOREIGN PATENT DOCUMENTS

| | | |
|---|---|---|
| JP | 07-139550 | 5/1995 |
| JP | 07-317807 | 12/1995 |
| JP | 08-061443 | 3/1996 |
| JP | 08-226462 | 9/1996 |
| JP | 11-022753 | 1/1999 |

* cited by examiner

Primary Examiner—Rodney H Bonck
(74) Attorney, Agent, or Firm—Sughrue Mion, PLLC

(57) ABSTRACT

A rotation transmitting device includes: an inner member; a cylindrical outer member disposed around the inner member; and a one-way clutch. Also provided is a pair of support bearings between the outer peripheral surface of the inner member and the inner peripheral surface of the outer member. The one-way clutch has a cylindrical clutch outer ring; and a cylindrical clutch inner ring that is fixedly fitted externally to an axially middle portion of the outer peripheral surface of the inner member and that has the outer peripheral surface formed to be a cam surface with wedge-shaped spaces provided at predetermined pitches in a circumferential direction. Rollers are disposed in the respective wedge-shaped spaces and spring members are disposed in the wedge-shaped spaces such that they urge the rollers toward portions with smaller radial widths of the wedge-shaped spaces. A clutch retainer made of metal supports the rollers.

14 Claims, 9 Drawing Sheets

ROTATION TRANSMITTING DEVICE INCORPORATING ONE-WAY CLUTCH

BACKGROUND OF THE INVENTION

1. Field of the Invention

The present invention relates to a rotation transmitting device incorporating a one-way clutch that can be used as a driven pulley secured to an end of a rotating shaft of an alternator, which is, for example, an automotive generator, or as a pinion or the like secured to an end of a rotating shaft constituting a starter motor of an automotive starting device.

2. Description of the Related Art

FIG. 10 is a longitudinal sectional view showing a conventional alternator disclosed in, for example, Japanese Unexamined Patent Application Publication No. 7-139550.

Referring to FIG. 10, a rotating shaft 3 is rotatably supported by a pair of ball-and-roller bearings 4 in a housing 2. A rotor 5 and a commutator 6 are provided at a middle portion of the rotating shaft 3. A driven pulley 7 is secured to an end of the rotating shaft 3 extending out from one end (the right end in FIG. 10) of the housing 2.

When the alternator 1 configured as described above has been installed to an engine, an endless belt (not shown) is installed on the driven pulley 7. Motive power of a crankshaft of the engine is transmitted via an endless belt to the rotating shaft 3 to rotatably drive the rotating shaft, thereby generating power necessary for an automobile.

Hitherto, in general, the driven pulley 7 is simply secured to the rotating shaft 3. In recent years, however, a pulley device incorporating a one-way clutch has been proposed in, for example, Japanese Unexamined Patent Application Publication No. 56-101353, Japanese Unexamined Patent Application Publication No. 7-317807, Japanese Unexamined Patent Application Publication No. 8-61443, Japanese Unexamined Patent Application Publication No. 8-226462, Japanese Unexamined Patent Application Publication No. 11-22753, and Japanese Examined Patent Application Publication No. 7-72585. The pulley device is a rotation transmitting device with a built-in one-way clutch in which motive power is freely transmitted from an endless belt to a rotating shaft if a running speed of the endless belt is fixed or increasing, while relative rotation of the driven pulley and the rotating shaft is allowed if the running speed of the endless belt is decreasing.

FIG. 11 is a longitudinal sectional view showing an essential section of a conventional pulley device including a one-way clutch, FIG. 12 is a fragmentary sectional view taken at the line XII—XII of FIG. 11, and FIG. 13 is a perspective view showing an essential section of a retaining frame employed with the conventional pulley device including the one-way clutch.

Referring to FIG. 11 through FIG. 13, the pulley device with the built-in one-way clutch has a sleeve 8, which is an inner member that can be fixedly and externally fitted to the rotating shaft 3 of the alternator 1. A driven pulley 7a, which is a cylindrical outer member, is disposed concentrically with the sleeve 8. A pair of support bearings 9 and a roller clutch 10, which is the one-way clutch, are provided between an outer peripheral surface of the sleeve 8 and an inner peripheral surface of the driven pulley 7a.

The entire sleeve 8 is formed to be cylindrical, fixedly and externally fitted to an end of the rotating shaft 3 of the alternator 1, and can be rotated together with the rotating shaft 3. Hence, as shown in FIG. 11, a tapped hole 11 is formed in a middle portion of the inner peripheral surface of the sleeve 8, and the tapped hole 11 and an external thread formed on an external peripheral surface of a distal end portion of the rotating shaft 3 can be screwed with one another. A distal end portion of the inner peripheral surface of the sleeve 8 (the left end portion in FIG. 11) is provided with a locking hole 12 having a hexagonal section, so that a distal end of a tool, such as a hexagonal wrench, can be locked in the locking hole 12. A proximal end portion of the inner peripheral surface of the sleeve 8 (the right end portion in FIG. 11) is provided with a round hole 13 that fit, without a play, in a portion closer to the middle in the distal end portion of the rotating shaft 3.

To combine the sleeve 8 and the rotating shaft 3 so that they do not relatively rotate, other structure, such as a spline engagement structure, a noncircular fitting structure, or a key engagement may be employed. A central portion of the outer peripheral surface of the sleeve 8 has a large-diameter portion 14 that has a larger diameter than the rest thereof.

A half distal end portion of the outer peripheral surface of the driven pulley 7a is formed so that its section passing through an axis is serrated to hold a part of an endless belt called a poly-V belt. The roller clutch 10 is disposed at an axially middle portion in a space formed between the outer peripheral surface of the sleeve 8 and the inner peripheral surface of the driven pulley 7a, and the pair of bearings 9 are disposed at portions closer to both axial ends of the space so that the bearings axially clamp the roller clutch 10 from both ends.

The support bearings 9 support a radial load applied to the driven pulley 7a, while allowing relative rotation of the driven pulley 7a and the sleeve 8. The bearings 9 use, for example, deep-groove ball bearings.

The roller clutch 10 allows the transmission of torque between the driven pulley 7a and the sleeve 8 only if the driven pulley 7a attempts to relatively rotate in a predetermined direction with respect to the sleeve 8.

To construct the roller clutch 10 as described above, a clutch inner ring 21 is externally fitted and secured to the large-diameter portion 14 of the sleeve 8 by tightening. The clutch inner ring 21 is formed by subjecting a steel sheet made of cement steel or the like to plastic working, such as press working, to form the entire body into a cylindrical shape, a cam surface 22 being formed on its outer peripheral surface. More specifically, a plurality of recessed sections 23 like ramps are equidistantly formed in the circumferential direction in the outer peripheral surface of the clutch inner ring 21 thereby to form the cam surface 22. A chamfered portion 24 shaped like a conical recessed surface is formed on one end portion (the left end portion in FIG. 11) of the inner peripheral surface of the clutch inner ring 21. The chamfered portion 24 serves as a guiding surface for press-fitting the clutch inner ring 21 onto the outer peripheral surface of the large-diameter portion 14.

Furthermore, a clutch outer ring 25 is internally fitted and secured to a middle portion of the inner peripheral surface of the driven pulley 7a by tightening. In the inner peripheral surface of the clutch outer ring 25, at least an axially middle portion abutting against rollers 26, which will be discussed hereinafter, is shaped simply as a cylindrical surface. The clutch outer ring 25 is formed by subjecting a steel sheet made of cement steel or the like to plastic working, such as press working, to form the entire body into a cylindrical shape, and inward flange-shaped jaws 27a and 27b, which provide a circular portion, are formed on both axial ends thereof. Of the two jaws 27a and 27b, the jaw 27a has the same thickness as the cylindrical portion of the clutch outer ring 25 because it is formed beforehand in the manufacture of the clutch outer ring 25. On the other hand, the jaw 27b is made thinner because it is formed across the diameter inside the clutch outer ring 25 after the rollers 26, which will be discussed later, and a clutch retainer 28 are installed.

A plurality of rollers 26 constructing the roller clutch 10, together with the clutch inner ring 21 and the clutch outer ring 25, are supported by the clutch inner ring 21 by the externally fitted clutch retainer 28, which is prohibited from rotating in relation to the clutch inner ring 21, such that they are allowed to roll and to be slightly displaced in the circumferential direction. The clutch retainer 28 is formed of a synthetic resin (e.g. a mixture made by adding about 20% of glass fiber to a synthetic resin, such as polyamide 66, polyamide 46, or polyphenylene sulfide) into a cage-like cylindrical shape. Each segment of the clutch retainer 28 has a pair of annular rims 29 and a plurality of pillars 30 connecting the paired rims 29.

A square space surrounded by the inner side surfaces of the rims 29 and the circumferential side surfaces of the pillars 30 constitutes a pocket 31. Each of the rollers 26 is supported in each of the pockets 31 such that it rolls and is slightly displaced in the circumferential direction. Furthermore, an arc-shaped protuberances 32 are formed on a plurality of locations on the inner peripheral surface of each rim 29, and the clutch retainer 28 is loosely fitted to the clutch inner ring 21. The protuberances 32 are engaged with the recessed sections 23 formed in the outer peripheral surface of the clutch inner ring 21 so as to prohibit the relative rotation with respect to the clutch inner ring 21.

Furthermore, a leaf spring 33 is held by a retaining section 30a provided on a circumferential side surface of the pillar 30, and disposed in each of the pockets 31. The leaf spring 33 faces a portion, which becomes narrower across the diameter, of a cylindrical gap formed between the outer peripheral surface of the cam surface 22 and the inner peripheral surface (cylindrical surface) of the middle portion of the clutch outer ring 25, and elastically presses the roller 26 in the circumferential direction of the clutch retainer 28. Both axial end surfaces of the clutch retainer 28 closely oppose the inner side surfaces of the two jaws 27a and 27b of the clutch outer ring 25 so as to prevent axial displacement of the clutch retainer 28.

In the pulley device incorporating the one-way clutch constructed as described above, if the driven pulley 7a and the sleeve 8 attempt to relatively rotate in a predetermined direction, then the rollers 26 move into the portion, which becomes narrower across the diameter, of the cylindrical gap formed between the outer peripheral surface of the cam surface 22 and the inner peripheral surface (cylindrical surface) of the middle portion of the clutch outer ring 25 to lock the driven pulley 7a and the sleeve 8 so that they cannot relatively rotate. On the other hand, when the driven pulley 7a and the sleeve 8 relatively rotate in a direction opposite to the predetermined direction, the rollers 26 withdraw to a portion, which becomes wider across the diameter, of the cylindrical gap formed between the outer peripheral surface of the cam surface 22 and the inner peripheral surface of the middle portion of the clutch outer ring 25, allowing the driven pulley 7a and the sleeve 8 to perform relative rotation (overrun).

The following will describe advantages obtained by applying the pulley device with the built-in one-way clutch to an alternator.

If a drive engine is a diesel engine, fluctuations in the rotational angular velocity of a crankshaft increase during low-speed revolution, such as in an idling mode. As a result, the running speed of an endless belt installed on a drive pulley finely fluctuates accordingly. On the other hand, changes in the rotational speed of the rotating shaft 3 rotatably driven by the endless belt via a driven pulley are not very sudden because of inertial mass of the rotating shaft 3 and a rotor secured to the rotating shaft 3.

As a result, if the driven pulley is simply secured to the rotating shaft 3, then the endless belt and the driven pulley tend to rub each other in both directions as the rotational angular velocity of the crankshaft changes. This causes stress to be repeatedly applied in different directions to the driven pulley and the endless belt rubbing each other, leading to slippage taking place between the endless belt and the driven pulley or a shortened service life of the endless belt.

When the pulley device with the built-in one-way clutch is used as the driven pulley, if the running speed of the endless belt is fixed or increasing, then the torque is transmitted from the driven pulley 7a to the rotating shaft 3. Conversely, if the running speed of the endless belt is decreasing, then the driven pulley 7a and the rotating shaft 3 perform relative rotation. Hence, if the running speed of the endless belt is decreasing, then the rotational angular velocity of the driven pulley 7a is set to be lower than the rotational angular velocity of the rotating shaft 3 to prevent severe rubbing between the endless belt and a contacting portion of the driven pulley 7a. With this arrangement, the direction of the stress applied to the rubbing portions of the driven pulley 7a and the endless belt can be fixed, thereby preventing the slippage between the endless belt and the driven pulley 7a and also preventing the shortening of the service life of the endless belt.

Furthermore, if the driven pulley is just secured to the rotating shaft 3, and if the rotational speed of the drive engine suddenly drops, then the rotational speed of the rotor secured to the rotating shaft 3 accordingly drops, resulting in a sudden drop in the amount of power generated by the alternator. In contrast to this, when the pulley device incorporating the one-way clutch is used as the driven pulley, even if the rotational speed of the driven engine suddenly drops, the rotational speed of the rotor slowly drops due to an inertial force, allowing power generation to be continued during the slow drop in the rotational speed of the rotor. With this arrangement, kinetic energies of the rotating shaft and the rotor can be effectively utilized with a resultant increased power generated by the alternator, as compared with a case where a fixed driven pulley is used.

When this type of pulley device incorporating the one-way clutch is mounted on an alternator or a starter motor, if the rotational speed of an engine considerably fluctuates, then the clutch is constantly overrun, leading to constant slippage between the rollers and the outer ring with resultant generation of considerable amount of heat. Thus, the frictional heat heats the pulley device incorporating the one-way clutch to a high temperature. In the conventional pulley device incorporating the one-way clutch, the clutch retainer 28 is made of a synthetic resin, so that the frictional heat deteriorates the rigidity of the clutch retainer 28. This has been presenting a problem in that the clutch retainer 28 may deform and interfere with an operation of the clutch or the clutch retainer 28 may incur thermal deterioration, failing to provide stable operation or satisfactory durability.

There has also been a problem in that the clutch retainer 28 has a complicated cage-like cylindrical shape, so that the productivity is poor, preventing a reduction in cost.

There has been another problem in that, since the clutch retainer 28 and the leaf spring 33 are made as separate components, meaning more components, and careless skipping of the installation of the leaf spring 33 tends to happen with resultant poor assembly efficiency.

There has been yet another problem in that the clutch retainer 28 is axially positioned by being held between the two jaws 17a and 17b of the clutch outer ring 25, so that the clutch retainer 28 is required to have highly accurate dimensions, leading to poor productivity.

SUMMARY OF THE INVENTION

The present invention has been made with a view toward solving the problems described above, and it is an object of the present invention to provide a rotation transmitting device incorporating a one-way clutch that has a metallic clutch retainer to improve its resistance to heat so as to provide high durability and stable operation.

In order to achieve the above object, according to one aspect of the present invention, there is provided a rotation transmitting device incorporating a one-way clutch, including: an inner member secured to an end of a rotating shaft; a cylindrical outer member disposed around the inner member so that it is concentric with the inner member; a one-way clutch that is provided between an axially middle portion of an outer peripheral surface of the inner member and an axially middle portion of an inner peripheral surface of the outer member, and allows torque to be transmitted between the outer member and the inner member only if the outer member attempts to perform relative rotation in a predetermined direction in relation to the inner member; and a pair of support bearings that are provided between the outer peripheral surface of the inner member and the inner peripheral surface of the outer member so as to hold the one-way clutch from both axial ends, and allow the inner member and the outer member to relatively rotate while supporting a radial load applied to the outer member, wherein the one-way clutch has a cylindrical clutch outer ring fixedly fitted externally to an axially middle portion of the inner peripheral surface of the outer member, a cylindrical clutch inner ring that is fixedly fitted externally to an axially middle portion of the outer peripheral surface of the inner member and that has its outer peripheral surface formed to be a cam surface with wedge-shaped spaces provided at predetermined pitches in a circumferential direction, the wedge-shaped spaces being defined by gaps that are formed between the outer peripheral surface thereof and the inner peripheral surface of the clutch outer ring and that gradually become narrower in one circumferential direction, rollers disposed in the respective wedge-shaped spaces, spring members disposed in the wedge-shaped spaces such that they urge the rollers toward portions with smaller radial widths of the wedge-shaped spaces, and a clutch retainer that is disposed such that it cannot perform relative rotation with respect to the clutch inner ring and supports the rollers such that the rollers may roll and be displaced in a circumferential direction, and wherein the clutch retainer is made of metal.

According to another aspect of the present invention, there is provided a rotation transmitting device incorporating a one-way clutch, including: an inner member secured to an end of a rotating shaft; a cylindrical outer member disposed around the inner member so that it is concentric with the inner member; a one-way clutch that is provided between an axially middle portion of an outer peripheral surface of the inner member and an axially middle portion of an inner peripheral surface of the outer member, and allows torque to be transmitted between the outer member and the inner member only if the outer member attempts to perform relative rotation in a predetermined direction in relation to the inner member; and a pair of support bearings that are provided between the outer peripheral surface of the inner member and the inner peripheral surface of the outer member so as to hold the one-way clutch from both axial ends, and allow the inner member and the outer member to relatively rotate while supporting a radial load applied to the outer member, wherein the one-way clutch has a cylindrical clutch outer ring fixedly fitted internally to an axially middle portion of the inner peripheral surface of the outer member, a large-diameter portion of the inner member that is formed on an axially middle portion of the outer peripheral surface of the inner member and that has its outer peripheral surface formed to be a cam surface with wedge-shaped spaces provided at predetermined pitches in a circumferential direction, the wedge-shaped spaces being defined by gaps that are formed between the outer peripheral surface thereof and the inner peripheral surface of the clutch outer ring and that gradually become narrower in one circumferential direction, rollers disposed in the respective wedge-shaped spaces, spring members disposed in the wedge-shaped spaces such that they urge the rollers toward portions with smaller radial widths of the wedge-shaped spaces, and a clutch retainer that is disposed such that it cannot perform relative rotation with respect to the inner member and supports the rollers such that the rollers may roll and be displaced in a circumferential direction, and wherein the clutch retainer is made of metal.

DESCRIPTION OF THE PREFERRED EMBODIMENTS

The following will describe embodiments of the present invention in conjunction with the accompanying drawings.

First Embodiment

Figure 1:
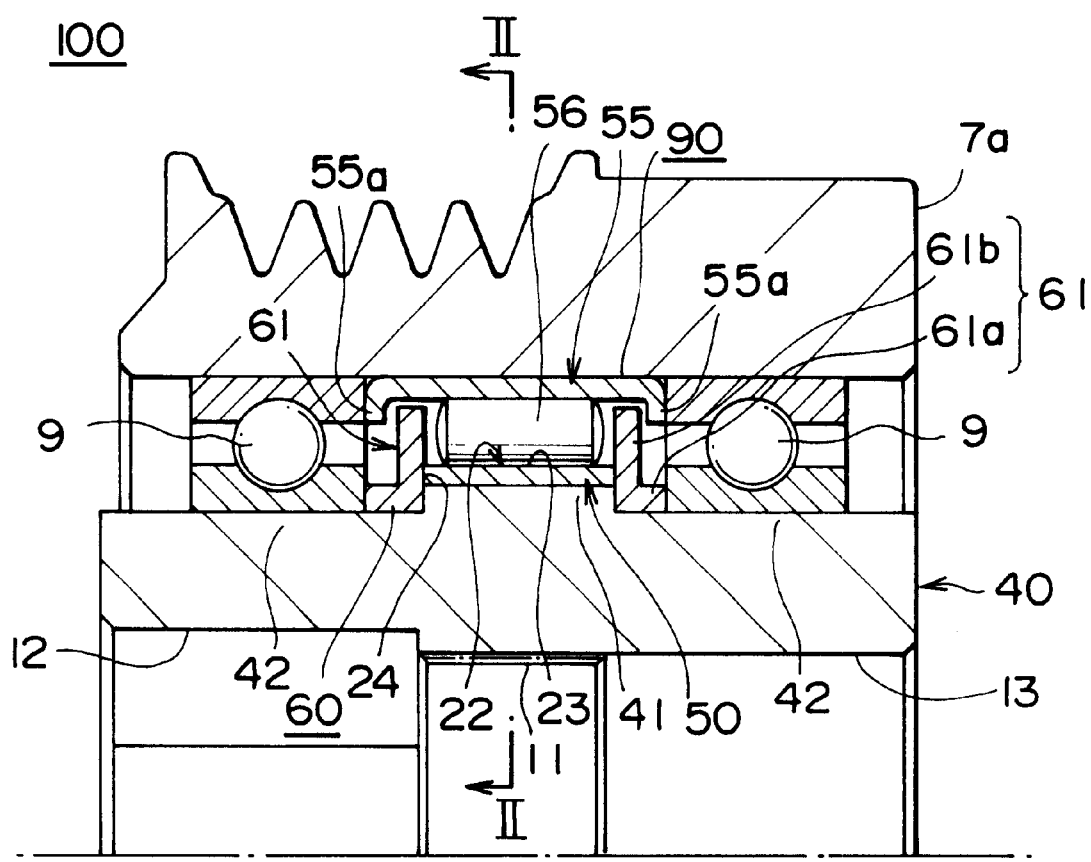
FIG. 1 is a longitudinal sectional view showing an essential section of a pulley device incorporating a one-way clutch according to a first embodiment of the present invention.
Figure 2:
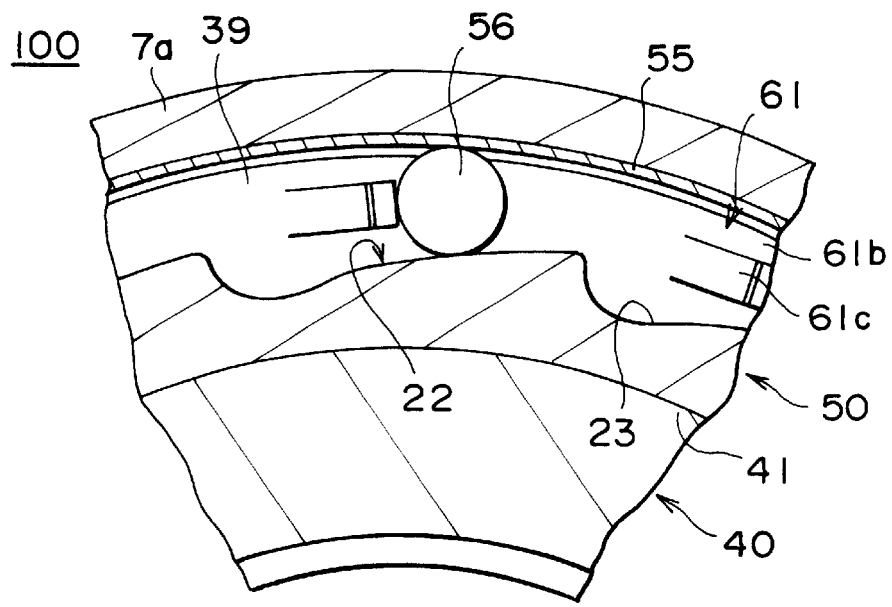
FIG. 2 is a fragmentary sectional view taken along the line II—II of FIG. 1.
Figure 3:
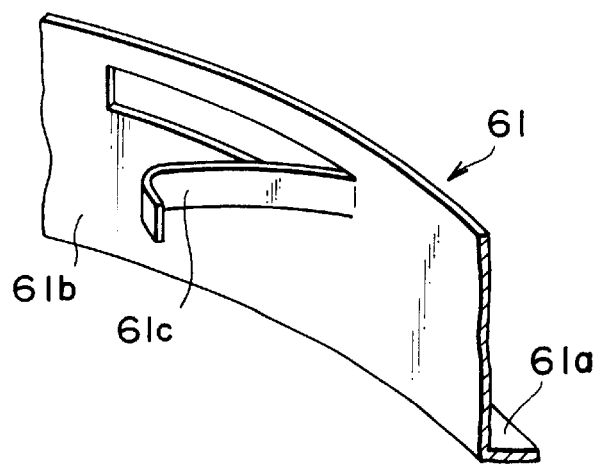
FIG. 3 is a partial cutaway perspective view showing a construction of a clutch retainer applied to the pulley device incorporating the one-way clutch according to the first embodiment of the present invention.
Figure 4:
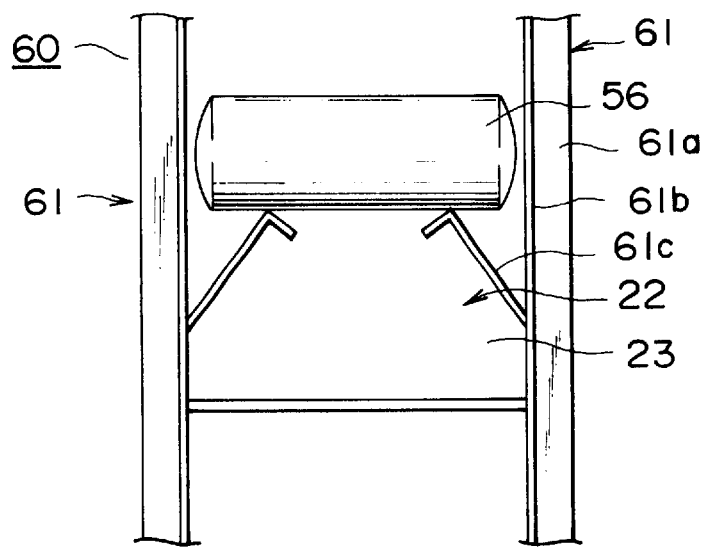
FIG. 4 is a diagram illustrating the disposition of a clutch retainer applied to the pulley device incorporating the one-way clutch according to the first embodiment of the present invention.

FIG. 1 is a longitudinal sectional view showing an essential section of a pulley device incorporating a one-way clutch according to a first embodiment of the present invention; FIG. 2 is a fragmentary sectional view taken along the line II—II of FIG. 1; FIG. 3 is a partial cutaway perspective view showing a construction of a clutch retainer applied to the pulley device incorporating the one-way clutch according to the first embodiment of the present invention; and FIG. 4 is a diagram illustrating the disposition of a clutch retainer applied to the pulley device incorporating the one-way clutch according to the first embodiment of the present invention.

In the drawings, components that are the same as or equivalent to those of the conventional pulley device incorporating a one-way clutch will be assigned the same reference numerals, and the descriptions thereof will be omitted or briefed.

Referring to the drawings, a pulley device 100 with a built-in one-way clutch has a sleeve 40, which is an inner member that can be secured and fitted externally to a rotating shaft 3 of an alternator 1. A driven pulley 7a, which is a cylindrical outer member, is disposed concentrically with the sleeve 40. A pair of support bearings 9 and a roller clutch 90, which is the one-way clutch, are provided between an outer peripheral surface of the sleeve 40 and an inner peripheral surface of the driven pulley 7a.

The entire sleeve 40 is formed to be cylindrical, secured and fitted externally to an end of the rotating shaft 3 of the alternator 1, and can be rotated together with the rotating shaft 3. As in the case of the conventional sleeve 8, the sleeve 40 has a tapped hole 11 formed in a middle portion of the inner peripheral surface thereof, a locking hole 12 formed in a distal end portion of the inner peripheral surface thereof (the left end portion in FIG. 1), and a round hole 13 in a proximal end portion of the inner peripheral surface thereof (the right end portion in FIG. 1). Furthermore, an axially middle portion of the sleeve 40 is formed to be a large-diameter portion 41 having its outer peripheral surface shaped as a cylindrical surface, and both ends of the large-diameter portion 41 are formed to provide small-diameter portions 42 having their outer peripheral surfaces as cylindrical surfaces.

A clutch inner ring 50 is externally fitted and secured by being press-fitted into the large-diameter portion 41 of the sleeve 40 such that it cannot relatively rotate with respect to the sleeve 40. The clutch inner ring 50 is formed by subjecting a steel sheet made of cement steel or the like to plastic working, such as press working, to form the entire body into a cylindrical shape, a cam surface 22 being formed on its outer peripheral surface. More specifically, a plurality of recessed sections 23 like ramps are equidistantly formed in the circumferential direction in the outer peripheral surface of the clutch inner ring 50 thereby to form the cam surface 22. A chamfered portion 24 shaped like a conical recessed surface is formed on one end portion (the left end portion in FIG. 1) of the inner peripheral surface of the clutch inner ring 50. The chambered portion 24 serves as a guiding surface for press-fitting the clutch inner ring 50 onto the outer peripheral surface of the large-diameter portion 41.

Furthermore, a clutch outer ring 55 is internally fitted and secured by being press-fitted to a middle portion of the inner peripheral surface of the driven pulley 7a so that it cannot relatively rotate with respect to the driven pulley 7a. In the inner peripheral surface of the clutch outer ring 55, at least an axially middle portion abutting against rollers 56, which will be discussed hereinafter, is shaped simply as a cylindrical surface. The clutch outer ring 55 is formed by subjecting a steel sheet made of cement steel or the like to plastic working, such as press working, to form the entire body into a cylindrical shape, and inward flange-shaped jaws 55a, which provide a circular portion, are formed on both axial ends. The two jaws 55a are made thin because they are formed on the inner side across the diameter of the clutch outer ring 55 after rollers 56 and a clutch retainer 60, which will be discussed later, are installed.

Thus, wedge-shaped spaces 39 are provided at predetermined pitches in a circumferential direction, which are defined by gaps (radial width) between the cam surface 22 of the clutch inner ring 50 and the inner peripheral surface of the clutch outer ring 55, the gaps gradually becoming narrower in one circumferential direction.

The clutch retainer 60 is composed of a pair of retaining plates 61 formed by metal sheets, such as stainless sheets. Each of the retaining plates 61 is composed of a cylindrical flange 61a, a main body 61b extending along the full circumference outward in the radial direction from one end of the flange 61a, and a spring section 61c, a spring member, formed by cutting and raising a part of the main body 61b. Each retaining plate 61 is externally fitted and fixed by being press-fitted to each of the small-diameter portions 42 from both ends of the sleeve 40 such that an end surface of the main body 61b abuts against an end surface of the large-diameter portion 41 of the sleeve 40. Thus, the retaining plates 61 are axially positioned and installed such that they cannot relatively rotate with respect to the sleeve 40.

The rollers 56 are provided in the wedge-shaped spaces 39 and supported by the clutch retainer 60 secured and fitted externally to the sleeve 40, namely, by the pair of retaining plates 61, such that they may roll and be slightly displaced in the circumferential direction. Each of the rollers 56 is urged by the spring section 61c toward a portion of the wedge-shaped space 39 that has a smaller radial width.

Both ends of the clutch outer ring 55 are bent inward in the radial direction to form the jaws 55a after the rollers 56 and the clutch retainer 60 are installed. The inner surfaces of the two jaws 55a of the clutch outer ring 55 closely oppose the outer surface of the main body 61b of the retaining plate 61.

A pair of support bearings 9 are press-fitted between the outer peripheral surface of the small-diameter portion 42 of the sleeve 40 and the inner peripheral surface of the driven pulley 7a such that they abut against the end surfaces of the flanges 61a of the retaining plates 61.

Thus, the clutch inner ring 50, the clutch outer ring 55, the rollers 56, and the clutch retainer 60 make up the roller clutch 90.

In the pulley device 100 incorporating the one-way clutch constructed as described above, if the driven pulley 7a and the sleeve 40 attempt to relatively rotate in a predetermined direction, then the rollers 56 move into the portion, which becomes narrower across the diameter, of the wedge-shaped spaces 39 formed between the outer peripheral surface of the cam surface 22 and the inner peripheral surface (cylindrical surface) of the middle portion of the clutch outer ring 55 to lock the driven pulley 7a and the sleeve 40 so that they cannot relatively rotate. On the other hand, when the driven pulley 7a and the sleeve 40 relatively rotate in a direction opposite to the predetermined direction, the rollers 56 withdraw to a portion, which becomes wider across the diameter, of the wedge-shaped spaces 39 formed between the outer peripheral surface of the cam surface 22 and the inner peripheral surface of the middle portion of the clutch outer ring 55, allowing the driven pulley 7a and the sleeve 40 to perform relative rotation (overrun).

Hence, the pulley device 100 incorporating the one-way clutch will provide the same advantages obtained by the conventional pulley device when the pulley device 100 is mounted on an alternator.

According to the first embodiment, since the clutch retainer 60 is made of a metal sheet, such as a stainless sheet, high resistance to heat can be achieved. Thus, mounting the embodiment on an alternator makes it possible to prevent deterioration in the rigidity or heat deterioration of the clutch retainer 60 caused by frictional heat described above, thus enabling stable operation and high durability to be achieved.

The clutch retainer 60 is formed by the pair of retaining plates 61, each of the retaining plates 61 having the main body 61b extending along the full circumference outward in the radial direction from one end of the flange 61a. This arrangement permits an extremely simpler configuration than that of the conventional clutch retainer 28 having the complicated cage type cylindrical shape. A result is higher productivity and reduced cost.

Moreover, the spring sections 61c are formed by cutting and raising a part of the main bodies 61b, so that the number of components can be reduced and skipping the installation of spring members can be prevented, resulting in improved assemblability.

Furthermore, the axially middle portion of the sleeve 40 is formed to be the large-diameter portion 41, and the retaining plates 61 are press-fitted to the small-diameter portion 42 of the sleeve 40 so that the end surfaces of the main bodies 61b abut against the end surface of the large-diameter portion 41. This arrangement allows the retaining plates 61 to be axially positioned simply by press-fitting the retaining plates 61 to the small-diameter portion 42. Thus, high dimensional accuracy is no longer required for the retaining plates 61, that is, the clutch retainer 60, permitting improved productivity to be achieved.

In addition, the pair of support bearings 9 are press-fitted between the outer peripheral surface of the small-diameter portion 42 of the sleeve 40 and the inner peripheral surface of the driven pulley 7a such that they abut against the end surfaces of the flanges 61a of the retaining plates 61. This arrangement securely prevents axial movement of the retaining plates 61 and restricts the axial movement of the clutch outer ring 55, preventing contact between the main bodies 61b of the retaining plates 61 and the jaws 55a of the clutch outer ring 55. As a result, stable operation can be accomplished.

In the first embodiment described above, the axial positioning is performed by abutting the end surfaces of the retaining plates 61 against the end surface of the large-diameter portion 41 of the sleeve 40. The same advantages can be obtained by abutting the end surfaces of the retaining plates 61 against the end surface of the clutch inner ring 50 to perform the axial positioning.

Second Embodiment

Figure 5:
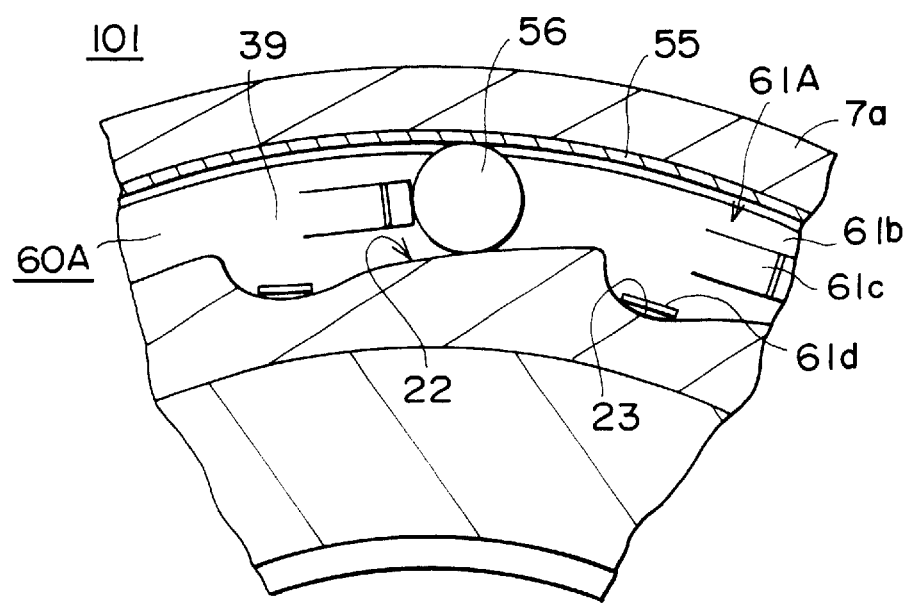
FIG. 5 is a cross-sectional view showing an essential section of a pulley device incorporating a one-way dutch according to a second embodiment of the present invention.
Figure 6:
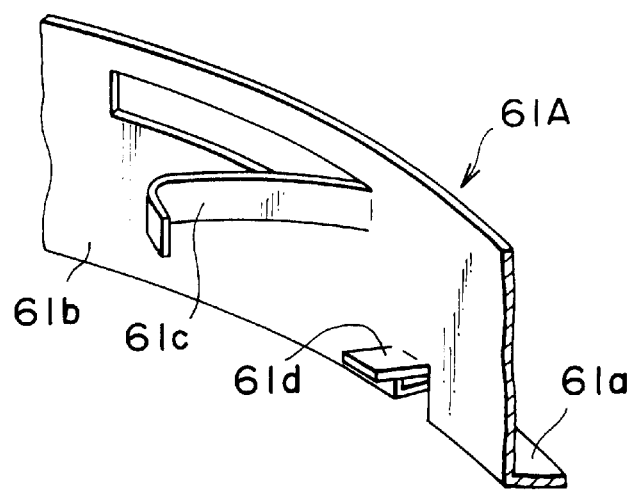
FIG. 6 is a partial cutaway perspective view showing a construction of a clutch retainer applied to the pulley device incorporating the one-way clutch according to the second embodiment of the present invention.
Figure 7:
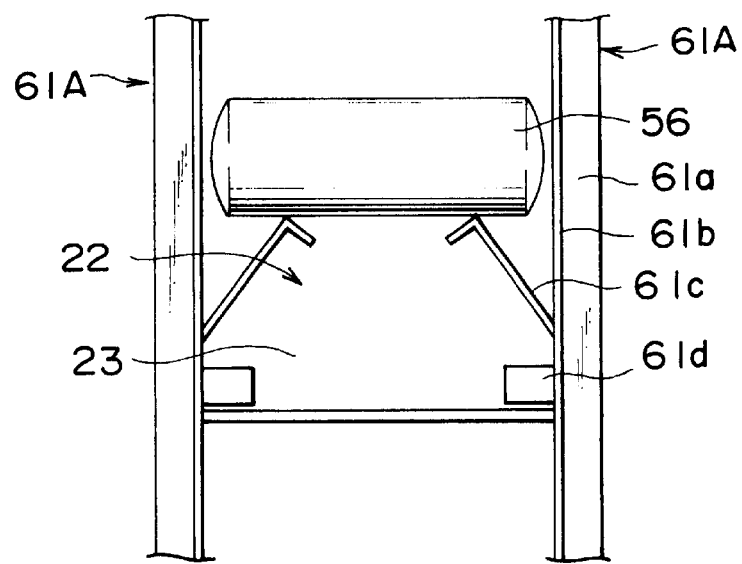
FIG. 7 is a diagram illustrating the disposition of a clutch retainer applied to the pulley device incorporating the one-way clutch according to the second embodiment of the present invention.

FIG. 5 is a cross-sectional view showing an essential section of a pulley device incorporating a one-way clutch according to a second embodiment of the present invention; FIG. 6 is a partial cutaway perspective view showing a construction of a clutch retainer applied to the pulley device incorporating the one-way clutch according to the second embodiment of the present invention; and FIG. 7 is a diagram illustrating the disposition of a clutch retainer applied to the pulley device incorporating the one-way clutch according to the second embodiment of the present invention.

Referring to the above drawings, a clutch retainer 60A is formed of a pair of retaining plates 61A made of metal sheets, such as stainless sheets. Each of the retaining plates 61A is composed of a cylindrical flange 61a, a main body 61b extending outward along the full circumference in the radial direction from one end of the flange 61a, a spring section 61c, a spring member, formed by cutting and raising a part of the main body 61b, and a detent 61d formed by cutting and raising a pat of the main body 61b. Each retaining plate 61A is externally fitted and fixed by being press-fitted to each of small-diameter portions 42 from both ends of a sleeve 40 such that an end surface of the main body 61b abuts against an end surface of the large-diameter portion 41 of the sleeve 40 and that the detent 61d engages a recessed portion 23 of a cam surface 22. Thus, the retaining plates 61 are axially and circumferentially positioned and installed such that they cannot relatively rotate with respect to the sleeve 40.

The rest of the construction of the second embodiment is the same as the construction of the first embodiment.

A pulley device 101 incorporating a one-way clutch according to the second embodiment provides the same advantages as those of the first embodiment. Moreover, the retaining plate 61A is press-fitted to the small-diameter portion 42 of the sleeve 40 such that the detent 61d, which is formed by cutting and raising a part of the main body 61b of the retaining plate 61A, engages the recessed section 23 of the cam surface 22; hence, the detent 61d functions as a positioning member, permitting easier circumferential positioning of the retaining plates 61A.

In the second embodiment, the retaining plates 61A are press-fitted to the small-diameter portion 42 of the sleeve 40. Alternatively, however, the retaining plates 61A may be loosely fitted to the small-diameter portion 42 of the sleeve 40. In this case, the engagement of the detent 61d with the recessed section 23 of the cam surface 22 circumferentially positions the retaining plate 61A and also prohibits the relative rotation of the retaining plate 61A in relation to the sleeve 40. Furthermore, the retaining plate 61A is axially positioned by holding the retaining plate 61A between the support bearing 9 and the end surface of the large-diameter portion 41.

Third Embodiment

Figure 8:
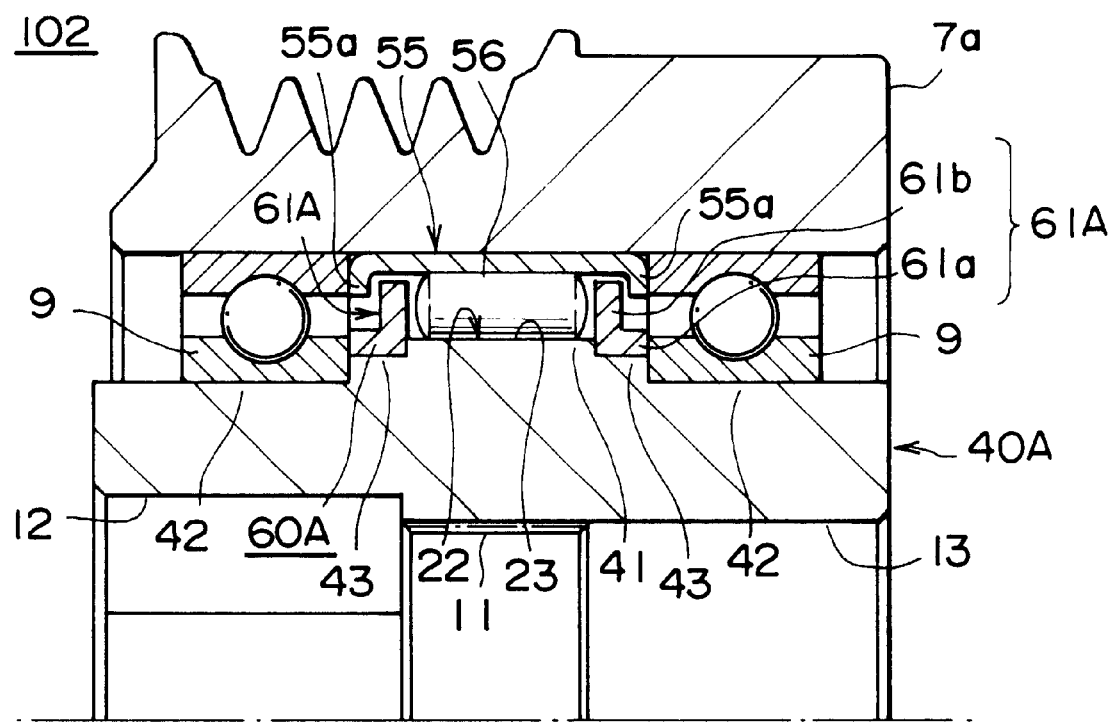
FIG. 8 is a longitudinal sectional view showing an essential section of a pulley device incorporating a one-way clutch according to a third embodiment of the present invention.

FIG. 8 is a longitudinal sectional view showing an essential section of a pulley device incorporating a one-way clutch according to a third embodiment of the present invention.

Referring to FIG. 8, a sleeve 40A has its axially middle portion formed to be a large-diameter portion 41 with its outer peripheral surface formed as a cam surface 22. On both sides of the large-diameter portion 41, small-diameter portions 42 having cylindrical outer peripheral surfaces are formed. Furthermore, intermediate-diameter portions 43 having cylindrical outer peripheral surfaces are formed on both axial ends of the large-diameter portion 41. Wedge-shaped spaces are provided at predetermined pitches in a circumferential direction, which are defined by gaps (radial width) between the cam surface 22 of the large-diameter portion 41 and the inner peripheral surface of a clutch outer ring 55, the gaps gradually becoming narrower in one circumferential direction. Rollers 56 are disposed in the respective wedge-shaped spaces, and the retaining plate 61A is press-fitted to the intermediate-diameter portion 43 from both axial ends such that the end surface of the main body 61b abuts against the end surface of the large-diameter portion 41 of the sleeve 40A. Thus, the large-diameter portion 41 of the sleeve 40A, the clutch outer ring 55, the rollers 56, and the clutch retainer 60A make up a roller clutch.

The rest of the construction of the third embodiment is the same as the construction of the second embodiment.

A pulley device 102 incorporating a one-way clutch according to the third embodiment provides the same advantages as those of the second embodiment described above. Moreover, since the outer peripheral surface of the large-diameter portion 41 of the sleeve 40A is formed to be the cam surface 22, the clutch inner ring 50 is no longer required, so that the number of components can be reduced. This permits improved assemblability and lower cost.

In the third embodiment described above, the intermediate-diameter portions 43 are formed at both ends of the large-diameter portion 41 of the sleeve 40A. Alternatively, however, the axially middle portion of the sleeve may be formed to be the large-diameter portion 41 having its outer peripheral surface as the cam surface 22, and both axial end portions of the large-diameter portion of the sleeve may be formed to be the small-diameter portions 42 having the cylindrical outer peripheral surfaces, thus omitting the intermediate-diameter portion 43. In this case, the retaining plates 61A are mounted on the sleeve by being press-fitted to the small-diameter portions 42 from both axial ends such that the end surfaces of the main bodies 61b abut against the end surfaces of the large-diameter portion 41 of the sleeve. Since the intermediate-diameter portions 43 are omitted, the manufacturing cost of the sleeve can be fabricated more easily at lower cost accordingly.

Fourth Embodiment

Figure 9:
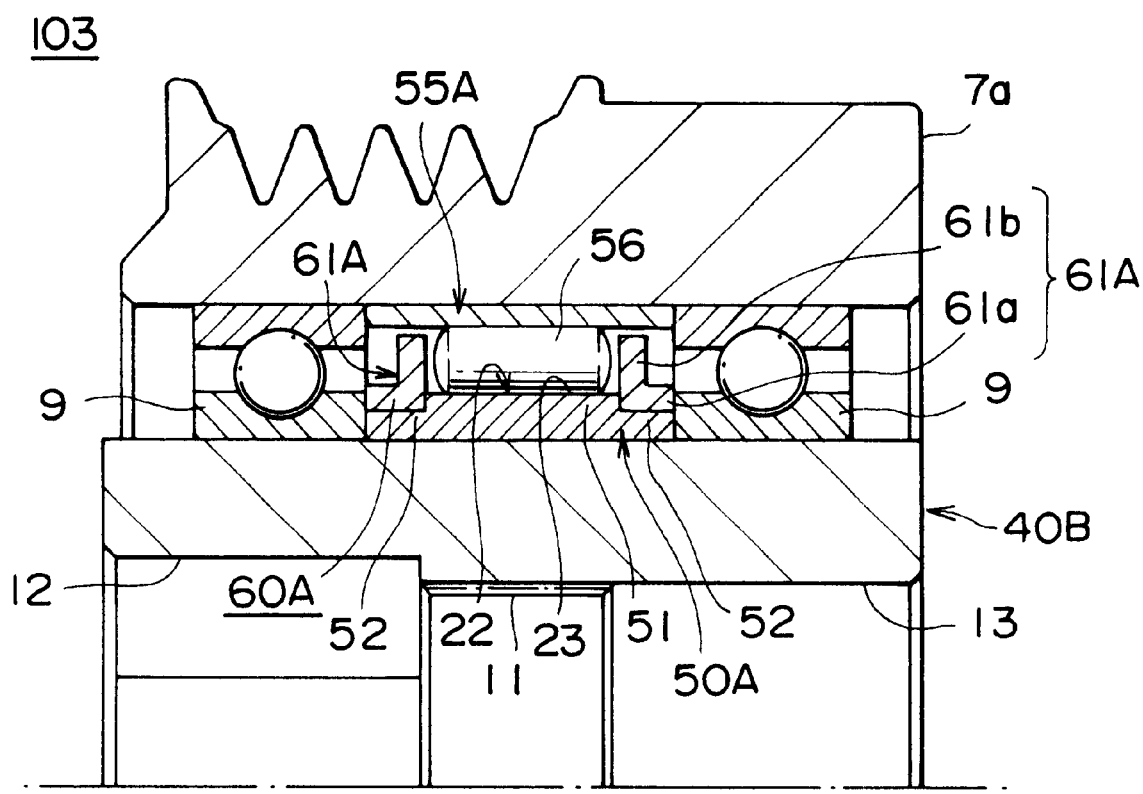
FIG. 9 is a longitudinal sectional view showing an essential section of a pulley device incorporating a one-way clutch according to a fourth embodiment of the present invention.
Figure 10:
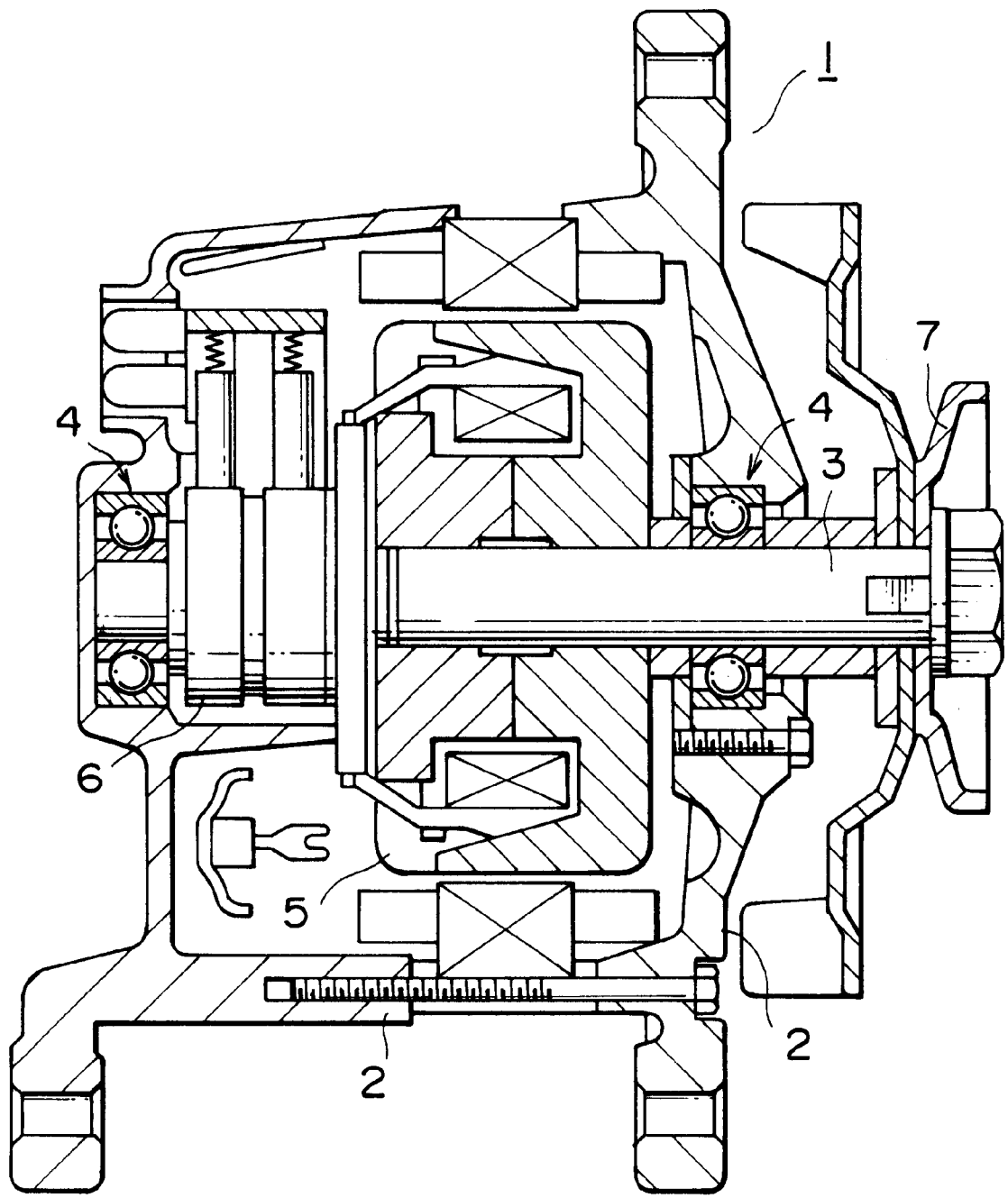
FIG. 10 is a longitudinal sectional view showing a conventional alternator.
Figure 11:
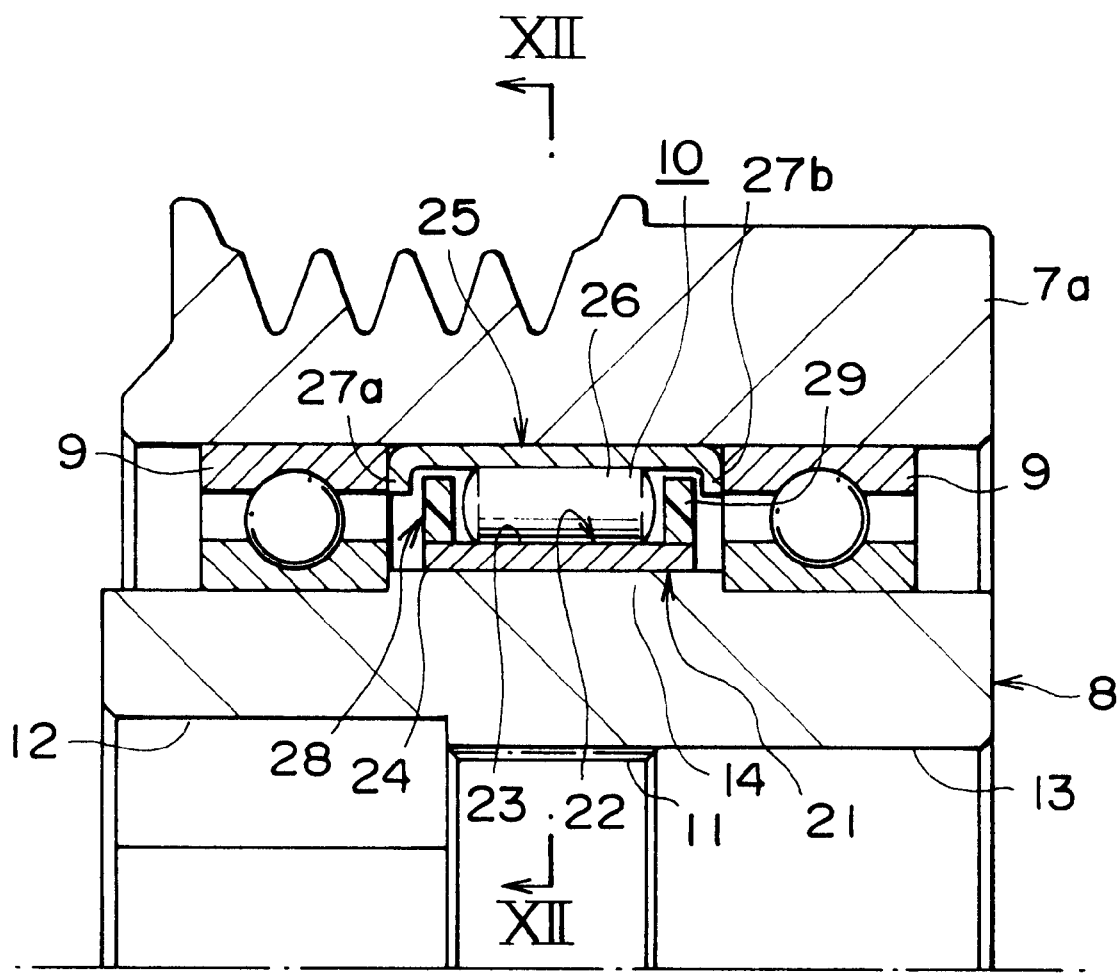
FIG. 11 is a longitudinal sectional view showing an essential section of a conventional pulley device incorporating a one-way clutch.
Figure 12:
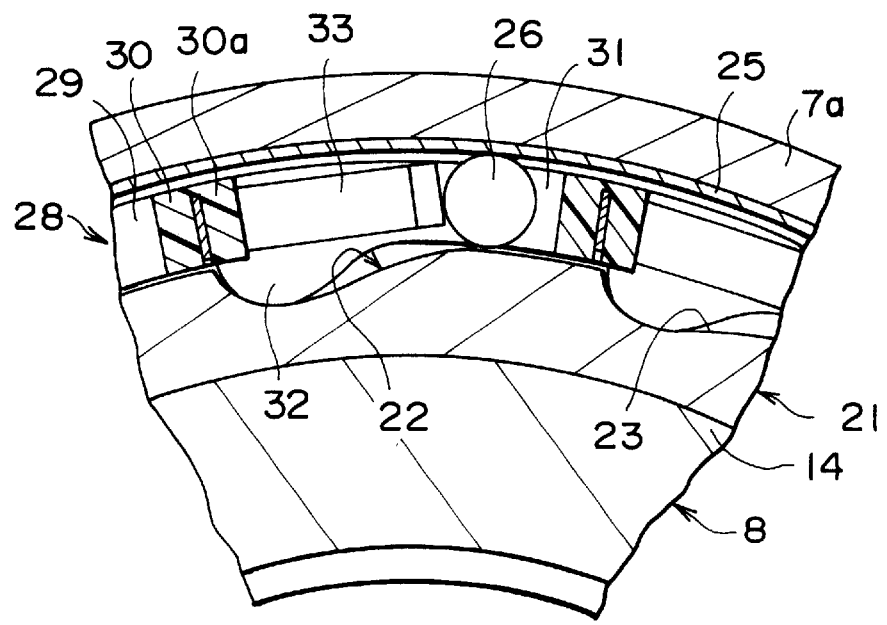
FIG. 12 is a fragmentary sectional view taken along the line XII—XII of FIG. 11.
Figure 13:
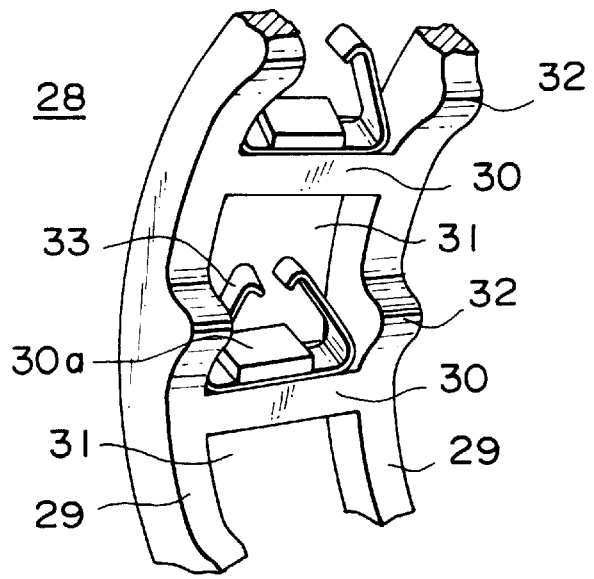
FIG. 13 is a perspective view showing an essential section of a retaining frame employed in the conventional pulley device incorporating the one-way clutch.

FIG. 9 is a longitudinal sectional view showing an essential section of a pulley device incorporating a one-way clutch according to a fourth embodiment of the present invention.

Referring to FIG. 9, a sleeve 40B has a cylindrical outer peripheral surface. A clutch inner ring 50A has its axially middle portion formed to be a large-diameter portion 51 with its outer peripheral surface formed as a cam surface 22, and has its both axial end portions formed to be small-diameter portions 52 having cylindrical outer peripheral surfaces. A clutch outer ring 55A is formed to be cylindrical. Wedge-shaped spaces are provided at predetermined pitches in a circumferential direction, the wedge-shaped spaces being defined by gaps (radial width) between the cam surface 22 of the large-diameter portion 51 and the inner peripheral surface of a clutch outer ring 55A, the gaps gradually becoming narrower in one circumferential direction. Rollers 56 are disposed in the respective wedge-shaped spaces, and retaining plates 61A are press-fitted to the small-diameter portions 42 from both axial ends such that the end surface of a main body 61b abuts against the end surface of the large-diameter portion 51 of the clutch inner ring 50A. Thus, the clutch inner ring 50A, the clutch outer ring 55, the rollers 56, and a clutch retainer 60A make up a roller clutch.

The rest of the construction of the fourth embodiment is the same as the construction of the second embodiment.

A pulley device 103 incorporating a one-way clutch according to the fourth embodiment provides the same advantages as those of the second embodiment described above. Moreover, the axially middle portion of the clutch inner ring 50A is formed to be the large-diameter portion 51 with its outer peripheral surface formed as the cam surface 22, both end portions of the large-diameter portion 51 are formed to be small-diameter portions 52 having cylindrical outer peripheral surfaces, and the retaining plates 61A are press-fitted to the small-diameter portions 52, so that the outer peripheral surface of the sleeve 40B can be formed to be cylindrical. This obviates the need for forming the large-diameter portion on the axially middle portion of the sleeve 40B, permitting higher productivity of the sleeves and reduced cost accordingly. In addition, since the clutch outer ring 55A is shaped cylindrically, it is no longer necessary to bend the two ends inward across the diameter after it is fixedly fitted internally to the inner peripheral surface of the driven pulley 7a, thus leading to improved assemblability.

In the embodiments described above, a pair of ball bearings are employed as the pair of support bearings; the pair of support bearings, however, are not limited thereto. For example, a pair of roller bearings may be used, or one ball bearing and one roller bearing may be paired.

In the embodiments described above, the spring section 61c is formed by cutting and raising a part of the main body 61b; however, a spring section composed of a metal sheet, such as a stainless sheet, may be formed integrally with the main body 61b by welding or the like.

Furthermore, in the embodiments described above, the retaining plates 61 or 61A are formed of stainless steel. The retaining plates 61 or 61A, however, may be composed of cold rolled carbon steel sheets or spring steels, in addition to the stainless sheets.

Moreover, in the embodiments described above, the present invention has been applied as the pulleys for alternators. The present invention, however, is not limited to the above applications; the invention may be also applied to, for example, a rotation transmitting unit of a starter motor constituting an automotive starting device. In this case, an outer peripheral surface of a cylindrical outer member will be provided with a pinion gear that can be engaged with a ring gear formed on an outer peripheral surface of a flywheel.

The present invention configured as described above provides the following advantages.

The rotation transmitting device incorporating a one-way clutch in accordance with the present invention includes: an inner member secured to an end of a rotating shaft; a cylindrical outer member disposed around the inner member so that it is concentric with the inner member; a one-way clutch that is provided between an axially middle portion of an outer peripheral surface of the inner member and an axially middle portion of an inner peripheral surface of the outer member, and allows torque to be transmitted between the outer member and the inner member only if the outer member attempts to perform relative rotation in a predetermined direction in relation to the inner member; and a pair of support bearings that are provided between the outer peripheral surface of the inner member and the inner peripheral surface of the outer member so as to hold the one-way clutch from both axial ends, and allow the inner member and the outer member to relatively rotate while supporting a radial load applied to the outer member, wherein the one-way clutch has a cylindrical clutch outer ring fixedly fitted internally to an axially middle portion of the inner peripheral surface of the outer member, a cylindrical clutch inner ring that is fixedly fitted externally to an axially middle portion of the outer peripheral surface of the inner member and that has its outer peripheral surface formed to be a cam surface with wedge-shaped spaces provided at predetermined pitches in a circumferential direction, the wedge-shaped spaces being defined by gaps that are formed between the outer peripheral surface thereof and the inner peripheral surface of the clutch outer ring and that gradually become narrower in one circumferential direction, rollers disposed in the respective wedge-shaped spaces, spring members disposed in the wedge-shaped spaces such that they urge the rollers toward portions with smaller radial widths of the wedge-shaped spaces, and a clutch retainer that is disposed such that it cannot perform relative rotation with respect to the clutch inner ring and supports the rollers such that the rollers may roll and be displaced in a circumferential direction, and wherein the clutch retainer is made of metal. This arrangement makes it possible to accomplish a rotation transmitting device incorporating a one-way clutch that provides higher heat resistance of the clutch retainer, high durability, and stable operation.

The clutch retainer has a pair of retaining plates, each of the retaining plates being composed of a cylindrical flange and a main body extending along the full circumference outward in the radial direction from one end of the flange. The pair of retaining plates are externally fitted to the inner member such that they hold the rollers, with the main bodies opposing one another. With this arrangement, the construction of the clutch retainer can be simplified with resultant higher productivity and lower cost.

The spring members integrally formed with the main bodies reduce the number of components and eliminate the danger of forgetting installation of the spring members, leading to improved assemblability.

The spring members are formed by cutting and raising a part of the main bodies, so that the spring members can be formed at the same time when the retaining plates are fabricated.

The detent formed by cutting and raising a part of the main body engages with a portion of the cam surface of a predetermined area that includes a part, where a radial width of the wedge-shaped space reaches a maximum value, thereby to prevent the relative rotation of the retaining plate with respect to the clutch inner ring. This arrangement reduces the number of components and eliminates the danger of forgetting installation of the detent, leading to improved assemblability.

The clutch inner ring has its both axial end portions formed to be small-diameter portions with cylindrical outer peripheral surfaces, and has a large-diameter portion with its outer peripheral surface formed to be the cam surface, the large-diameter portion being located between the two small-diameter portions. The retaining plates are press-fitted to the small-diameter portions of the clutch inner ring such that the end surfaces of the main bodies abut against the end surfaces of the large-diameter portion of the clutch inner ring. This arrangement obviates the need for forming the large-diameter portion on the axially middle portion of the inner member, so that the productivity of the inner member can be improved, and the cost can be reduced accordingly. Moreover, the retaining plates abut against the end surfaces of the large-diameter portion thereby to be positioned in the axial direction; hence, high dimensional accuracy is no longer required for the retaining plates, permitting improved productivity.

The inner member has its axially middle portion formed to be the large-diameter portion, and the clutch inner ring is fixed and fitted externally to the large-diameter portion of the inner member. The retaining plates are press-fitted to the inner member such that the end surfaces of the main bodies abut against at least either the end surfaces of the large-diameter portion of the inner member or the end surfaces of the clutch inner ring. Thus, since the retaining plates are axially positioned by abutting against at least either the end surfaces of the large-diameter portion or the end surfaces of the clutch inner ring, high dimensional accuracy is no longer required for the retaining plates, permitting improved productivity.

Furthermore, the rotation transmitting device incorporating a one-way clutch according to the present invention includes: an inner member secured to an end of a rotating shaft; a cylindrical outer member disposed around the inner member so that it is concentric with the inner member; a one-way clutch that is provided between an axially middle portion of an outer peripheral surface of the inner member and an axially middle portion of an inner peripheral surface of the outer member, and allows torque to be transmitted between the outer member and the inner member only if the outer member attempts to perform relative rotation in a predetermined direction in relation to the inner member; and a pair of support bearings that are provided between the outer peripheral surface of the inner member and the inner peripheral surface of the outer member so as to hold the one-way clutch from both axial ends, and allow the inner member and the outer member to relatively rotate while supporting a radial load applied to the outer member, wherein the one-way clutch has a cylindrical clutch outer ring fixedly fitted internally to an axially middle portion of the inner peripheral surface of the outer member, a large-diameter portion of the inner member that is formed on an axially middle portion of the outer peripheral surface of the inner member and that has its outer peripheral surface formed to be a cam surface with wedge-shaped spaces provided at predetermined pitches in a circumferential direction, the wedge-shaped spaces being defined by gaps that are formed between the outer peripheral surface thereof and the inner peripheral surface of the clutch outer ring and that gradually become narrower in one circumferential direction, rollers disposed in the respective wedge-shaped spaces, spring members disposed in the wedge-shaped spaces such that they urge the rollers toward portions with smaller radial widths of the wedge-shaped spaces, and a clutch retainer that is disposed such that it cannot perform relative rotation with respect to the inner member and supports the rollers such that the rollers may roll and be displaced in a circumferential direction, and wherein the clutch retainer is made of metal. This arrangement makes it possible to accomplish a rotation transmitting device incorporating a one-way clutch featuring high heat resistance of a clutch retainer with resultant higher durability and stable operation, and lower cost because of the absence of the clutch inner ring.

The clutch retainer has a pair of retaining plates, each of the retaining plates being composed of a cylindrical flange and a main body extending along the full circumference outward in the radial direction from one end of the flange. The pair of retaining plates is externally fitted to the inner member such that they hold the rollers, with the main bodies opposing one another. With this arrangement, the construction of the clutch retainer can be simplified with resultant higher productivity and lower cost.

The spring members integrally formed with the main bodies reduce the number of components and eliminate the danger of forgetting installation of the spring members, leading to improved assemblability.

The spring members are formed by cutting and raising a part of the main bodies, so that the spring members can be formed at the same time when the retaining plates are fabricated.

The detent formed by cutting and raising a part of the main body engages with a portion of the cam surface of a predetermined area that includes a part, where a radial width of the wedge-shaped space reaches a maximum value, thereby to prevent the relative rotation of the retaining plate with respect to the inner member. This arrangement reduces the number of components and eliminates the danger of forgetting installation of the detent, leading to improved assemblability.

Both axial ends of the large-diameter portion of the inner member are formed to be the intermediate-diameter portions having cylindrical outer peripheral surfaces. The retaining plates are press-fitted to the intermediate-diameter portions of the inner member such that the end surfaces of the main bodies abut against the end surfaces of the large-diameter portion of the inner member. With this arrangement, the retaining plates are positioned in the axial direction by abutting against the end surfaces of the large-diameter portion, thus obviating the need for high dimensional accuracy in the retaining plates, with consequent improved productivity.

The retaining plates are press-fitted to the inner member such that the end surfaces of the main bodies abut against the end surfaces of the large-diameter portion of the inner member. With this arrangement, the retaining plates can be axially positioned by abutting against the end surfaces of the large-diameter portion, obviating the need for high dimensional accuracy in the retaining plates with resultant higher productivity. In addition, it is no longer necessary to form the intermediate-diameter portion, so that the inner member can be fabricated more easily, and the cost can be reduced accordingly.

What is claimed is:

1. A rotation transmitting device incorporating a one-way clutch, comprising:
    an inner member secured to an end of a rotating shaft;
    a cylindrical outer member disposed around the inner member so that it is concentric with the inner member;
    a one-way clutch that is provided between an outer peripheral surface of the inner member and an inner peripheral surface of the outer member, and allows torque to be transmitted between the outer member and the inner member only if the outer member attempts to perform relative rotation in a predetermined direction in relation to the inner member; and
    a pair of support bearings that are provided between the outer peripheral surface of the inner member and the inner peripheral surface of the outer member so as to hold the one-way clutch from both axial ends, and allow the inner member and the outer member to relatively rotate while supporting a radial load applied to the outer member,
    wherein the one-way clutch has a cylindrical clutch outer ring fixedly fitted internally to the inner peripheral surface of the outer member, a cylindrical clutch inner ring that is fixedly fitted externally to the outer peripheral surface of the inner member and that has the outer peripheral surface formed to be a cam surface with wedge-shaped spaces provided at predetermined pitches in a circumferential direction, the wedge-shaped spaces being defined by gaps that are formed between the outer peripheral surface thereof and the inner peripheral surface of the clutch outer ring and that gradually become narrower in one circumferential direction, rollers disposed in the respective wedge-shaped spaces, spring members disposed in the wedge-shaped spaces such that they urge the rollers toward portions with smaller radial widths of the wedge-shaped spaces, and a clutch retainer that is disposed such that it cannot perform relative rotation with respect to the clutch inner ring and supports the rollers in such a manner that the rollers may roll and be displaced in a circumferential direction, and
    wherein the clutch retainer is made of metal and has a pair of separate retaining plates, and wherein each of the retaining plates comprising a cylindrical flange and a main body extending along the full circumference outward in the radial direction from one end of the flange, the pair of retaining plates being externally fitted to the inner member such that they hold the rollers, with the main bodies opposing one another such that respective ends of the flanges face away from each other.

2. A rotation transmitting device incorporating a one-way clutch according to claim 1, wherein the spring members are integrally formed with the main bodies.

3. A rotation transmitting device incorporating a one-way clutch according to claim 2, wherein the spring members are formed by cutting and raising a part of the main bodies.

4. A rotation transmitting device incorporating a one-way clutch according to claim 1, further comprising a detent formed by cutting and raising a pact of the main body, the detent engaging with a portion of the cam surface of a predetermined area that includes a part, where a radial width of the wedge-shaped space reaches a maximum value, thereby to prevent the relative rotation of the retaining plate with respect to the clutch inner ring.

5. A rotation transmitting device incorporating a one-way clutch according to claim 1, wherein the clutch inner ring has its both axial end portions formed to be small-diameter portions with cylindrical outer peripheral surfaces, and has a large-diameter portion with its outer peripheral surface formed to be the cam surface, the large-diameter portion being located between the two small-diameter portions, and the retaining plates are press-fitted to the small-diameter portions of the clutch inner ring such that the end surfaces of the main bodies abut against the end surfaces of the large-diameter portion of the clutch inner ring.

6. A rotation transmitting device incorporating a one-way clutch according to claim 1, wherein the inner member has its axially middle portion formed to be a large-diameter portion, and the clutch inner ring is fixedly fitted externally to the large-diameter portion of the inner member, and the retaining plates are press-fitted to the inner member such that the end surfaces of the main bodies abut against at least either the end surfaces of the large-diameter portion of the inner member or the end surfaces of the clutch inner ring.

7. A rotation transmitting device incorporating a one-way clutch according to claim 1, wherein the one-way clutch is provided between an axial middle portion of the outer peripheral surface of the inner member and an axial middle portion of the inner peripheral surface of the outer member, and wherein the cylindrical clutch outer ring is fixedly fitted internally to an axial middle portion of the inner peripheral surface of the outer member, and the cylindrical clutch inner ring is fixedly fitted externally to an axial middle portion of the outer peripheral surface of the inner member.

8. A rotation transmitting device incorporating a one-way clutch, comprising:

an inner member secured to an end of a rotating shaft;

a cylindrical outer member disposed around the inner member so that it is concentric with the inner member;

a one-way clutch that is provided between an outer peripheral surface of the inner member and an inner peripheral surface of the outer member, and allows torque to be transmitted between the outer member and the inner member only if the outer member attempts to perform relative rotation in a predetermined direction in relation to the inner member; and a pair of support bearings that are provided between the outer peripheral surface of the inner member and the inner peripheral surface of the outer member so as to hold the one-way clutch from both axial ends, and allow the inner member and the outer member to relatively rotate while supporting a radial load applied to the outer member, wherein the one-way clutch has a cylindrical clutch outer ring fixedly fitted internally to the inner peripheral surface of the outer member, a large-diameter portion of the inner member that is formed on the outer peripheral surface of the inner member and that has its outer peripheral surface formed to be a cam surface with wedge-shaped spaces provided at predetermined pitches in a circumferential direction, the wedge-shaped spaces being defined by gaps that are formed between the outer peripheral surface and the inner peripheral surface of the clutch outer ring and that gradually become narrower in one circumferential direction, rollers disposed in the respective wedge-shaped spaces, spring members disposed in the wedge-shaped spaces such that they urge the rollers toward portions with smaller radial widths of the wedge-shaped spaces, and a clutch retainer that is disposed such that it cannot perform relative rotation with respect to the inner member and supports the rollers such that the rollers may roll and be displaced in a circumferential direction, and wherein the clutch retainer is made of metal and has a pair of separate retaining plates, and wherein each of the retaining plates comprising a cylindrical flange and a main body extending along the full circumference outward in the radial direction from one end of the flange, the pair of retaining plates being externally fitted to the inner member such that they hold the rollers, with the main bodies opposing one another such that respective ends of the flanges face away from each other.

9. A rotation transmitting device incorporating a one-way clutch according to claim 8, wherein the spring members are integrally formed with the main bodies.

10. A rotation transmitting device incorporating a one-way clutch according to claim 9, wherein the spring members are formed by cutting and raising a part of the main bodies.

11. A rotation transmitting device incorporating a one-way clutch according to claim 8, further comprising a detent formed by cutting and raising a part of the main body, the detent engaging with a portion of the cam surface of a predetermined area that includes a part, where a radial width of the wedge-shaped space reaches a maximum value, thereby to prevent the relative rotation of the retaining plate with respect to the inner member.

12. A rotation transmitting device incorporating a one-way clutch according to claim 8, wherein the both axial ends of the large-diameter portion of the inner member are formed on an intermediate-diameter portion having a cylindrical outer peripheral surface, and the retaining plates are press-fitted to the intermediate-diameter portion of the inner member such that the end surfaces of the main bodies abut against the end surfaces of the large-diameter portion of the inner member.

13. A rotation transmitting device incorporating a one-way clutch according to claim 8, wherein the retaining plates are press-fitted to the inner member such that the end surfaces of the main bodies abut against the end surfaces of the large-diameter portion of the inner member.

14. A rotation transmitting device incorporating a one-way clutch according to claim 8, wherein the one-way clutch is provided between an axial middle portion of the outer peripheral surface of the inner member and an axial middle portion of the inner peripheral surface of the outer member, and wherein the cylindrical clutch outer ring is fixedly fitted internally to an axial middle portion of the inner peripheral surface of the outer member, and the large-diameter portion of the inner member is formed on an axial middle portion of the outer peripheral surface of the inner member.

* * * * *